(12) United States Patent
Tong

(10) Patent No.: US 11,448,920 B2
(45) Date of Patent: Sep. 20, 2022

(54) REFLECTOR PLATE, BACKLIGHT MODULE AND DISPLAY TERMINAL

(71) Applicants: GUANGZHOU SHIYUAN ELECTRONICS CO., LTD., Guangdong (CN); GUANGZHOU SHIRUI ELECTRONICS CO., LTD., Guangdong (CN)

(72) Inventor: Yonglin Tong, Guangdong (CN)

(73) Assignees: GUANGZHOU SHIYUAN ELECTRONICS CO., LTD., Guangdong (CN); GUANGZHOU SHIRUI ELECTRONICS CO. LTD., Guangdong (CN)

( * ) Notice: Subject to any disclaimer, the term of this patent is extended or adjusted under 35 U.S.C. 154(b) by 0 days.

(21) Appl. No.: 17/272,066

(22) PCT Filed: Dec. 4, 2019

(86) PCT No.: PCT/CN2019/123088
§ 371 (c)(1),
(2) Date: Jun. 21, 2021

(87) PCT Pub. No.: WO2020/125420
PCT Pub. Date: Jun. 25, 2020

(65) Prior Publication Data
US 2022/0197087 A1   Jun. 23, 2022

(30) Foreign Application Priority Data
Dec. 20, 2018  (CN) .......................... 201822144363.9

(51) Int. Cl.
*G02F 1/00* (2006.01)
*G02F 1/13357* (2006.01)

(52) U.S. Cl.
CPC .............................. *G02F 1/133605* (2013.01)

(58) Field of Classification Search
None
See application file for complete search history.

(56) References Cited

U.S. PATENT DOCUMENTS

2020/0133071 A1\* 4/2020 Dai ................... G02F 1/133605

FOREIGN PATENT DOCUMENTS

| CN | 204629363 U | 9/2015 |
| CN | 206176161 U | 5/2017 |

(Continued)

OTHER PUBLICATIONS

International Application No. PCT/CN2019/123088, International Search Report and Written Opinion dated Mar. 4, 2020, 13 pages.

*Primary Examiner* — Gerald J Sufleta, II
(74) *Attorney, Agent, or Firm* — Zhong Law, LLC

(57) ABSTRACT

The present application relates to a reflector plate, a backlight module and a display terminal. The reflector plate includes a reflecting main board and a reflecting side board arranged at the periphery of the reflecting main board, and the reflecting side board is connected to the side edge of the reflecting main board. A first stitching line and a second stitching line, or a first fold line and a second fold line are arranged at a turning corner of the reflecting side board, such that an included angle is formed therebetween. After assembly, the reflecting side board can incline relative to the reflecting main board, and the reflecting side board between the first stitching line and the second stitching line or between the first fold line and the second fold line forms a curved reflecting surface.

20 Claims, 3 Drawing Sheets

(56) References Cited

FOREIGN PATENT DOCUMENTS

| | | |
|---|---|---|
| CN | 206741016 U | 12/2017 |
| CN | 209248202 U | 8/2019 |
| JP | 2017004643 A | 1/2017 |

* cited by examiner

REFLECTOR PLATE, BACKLIGHT MODULE AND DISPLAY TERMINAL

CROSS-REFERENCE TO RELATED APPLICATIONS

This application is the U.S. national stage of PCT/CN2019/123088 filed Dec. 4, 2019, which claims priority to Chinese Application No. 201822144363.9, having a title of "REFLECTOR PLATE, BACKLIGHT MODULE AND DISPLAY TERMINAL", filed to China National Intellectual Property Administration on Dec. 20, 2018. The contents of the above-identified applications are hereby incorporated in reference in their entireties.

TECHNICAL FIELD

The present application relates to the field of display technology, and in particular to a reflector plate, a backlight module and a display terminal.

BACKGROUND ART

Liquid crystal displays are classified into edge-lit liquid crystal displays and direct-lit liquid crystal displays based on the modes of backlight implementations. The direct-lit backlight displays have the advantages of low cost and ease to assembly, thereby being widely used. However, the traditional direct-lit design is easy to cause the phenomenon of shadows at four corners of the display, and the traditional technical solutions have limited effect on eliminating the shadows at the four corners.

SUMMARY OF THE DISCLOSURE

Based on this, it is necessary to provide a reflector plate, a backlight module, and a display terminal, which can improve the brightness at the corners and effectively eliminate the shadow phenomenon at corners.

One embodiment of this application provides a reflector plate including a reflecting main board and a reflecting side board arranged at the periphery of the reflecting main board, and the reflecting side board is connected to the side edge of the reflecting main board, and a first stitching line and a second stitching line are arranged at a turning corner of the reflecting side board, such that an included angle is formed between the first stitching line and the second stitching line. In a state where the reflecting side board is inclined relative to the reflecting main board, the reflecting side board between the first stitching line and the second stitching line forms a curved reflecting surface. Or, A first fold line and a second fold line are arranged at the turning corner of the reflecting side board, such that an included angle is formed between the first fold line and the second fold line. In a state where the reflecting side board is inclined relative to the reflecting main board, the reflecting side board between the first fold line and the second fold line forms the curved reflecting surface.

According to the above-mentioned reflector plate, during use, the reflecting side board is inclined relative to the reflecting main board, that is, the reflecting main board is stacked on the backplane, and the reflecting side board is bended toward the inner side of the backplane relative to the reflecting main board to form an inclined surface. And at the same time, the reflecting side board between the first stitching line and the second stitching line or between the first fold line and the second fold line is correspondingly inclined to form a curved reflecting surface. Thus, the portion at the turning corner of the reflector plate is in a smooth transition, and the distance between the curved reflecting surface and the backlight source at the corner can also be closer, and the light emitted from the backlight source can illuminate the curved reflecting surface, so as to increase the brightness value of this area, thereby achieving the objective of eliminating the shadow phenomenon.

In one of the embodiments, the intersection point of the first stitching line and the second stitching line or the intersection point of the first fold line and the second fold line is located at a vertex of the reflecting main board.

In one of the embodiments, the included angle between the first stitching line and the second stitching line or the included angle between the first fold line and the second fold line is in a range of 45° to 120°.

In one of the embodiments, the included angle between the first stitching line and the second stitching line or the included angle between the first fold line and the second fold line is 90°.

In one of the embodiments, the reflecting side board and the side edge of the reflecting main board are connected by a third stitching line or a third fold line.

In one of the embodiments, a breaking line is arranged on the reflecting side board, and in the state where the reflecting side board is inclined relative to the reflecting main board, the reflecting side board on both sides of the breaking line are butt-joined together.

In one of the embodiments, a mounting plate is arranged at the periphery of the reflecting side board, and the mounting plate and the side edge of the reflecting side board are connected by a fourth stitching line or a fourth fold line.

In one of the embodiments, the reflecting side board has a polygonal ring shape, and each turning corner of the reflecting side board is provided with the first stitching line and the second stitching line or with the first fold line and the second fold line.

One embodiment of this application provides a backlight module, including a backplane, a backlight source and the reflector plate, in which the backlight source and the reflector plate are arranged on the backplane, and a light transmission hole is opened on the reflector plate, and an illuminating element of the backlight source is arranged corresponding to the light transmission hole.

According to the above-mentioned backlight module, the reflecting side board is inclined relative to the reflecting main board, that is, the reflecting main board is stacked on the backplane, and the reflecting side board bends toward the inner side of the backplane relative to the reflecting main board to form an inclined surface. And at the same time, the reflecting side board between the first stitching line and the second stitching line or between the first fold line and the second fold line is correspondingly inclined to form a curved reflecting surface. Thus, the portion at the corner of the reflector plate is in a smooth transition, and the distance between the curved reflecting surface and the backlight source at the corner can also be closer, and the light emitted from the illuminating element of the backlight source through the light transmission hole can illuminate the curved reflecting surface, so as to increase the brightness value of this area, thereby achieving the objective of eliminating the shadow phenomenon.

One embodiment of this disclosure provides a display terminal, including the reflector plate or the backlight module.

The above-described display terminal including the reflector plate or the backlight module has the beneficial effects that the brightness values at the corners are increased, the shadow phenomenon is less, and the overall brightness is more uniform.

Reference to the Numerals: 10 reflector plate, 110 reflecting main board, 120 reflecting side board, 122 first stitching line, 124 second stitching line, 125 curved reflecting surface, 126 third stitching line, 127 breaking line, 128 fourth stitching line, 130 mounting plate, 20 backplane, 30 backlight source, 310 illuminating element.

DESCRIPTION OF THE PREFERRED EMBODIMENTS

In order to make the purpose, technical solutions and advantages of this application clearer, this application will be further described in detail hereinafter in conjunction with the drawings and concrete implementing modes. It should be understood that the particular implementing modes described herein are only used to explain this application, which do not limit the claimed scope of this application.

Figure 1:
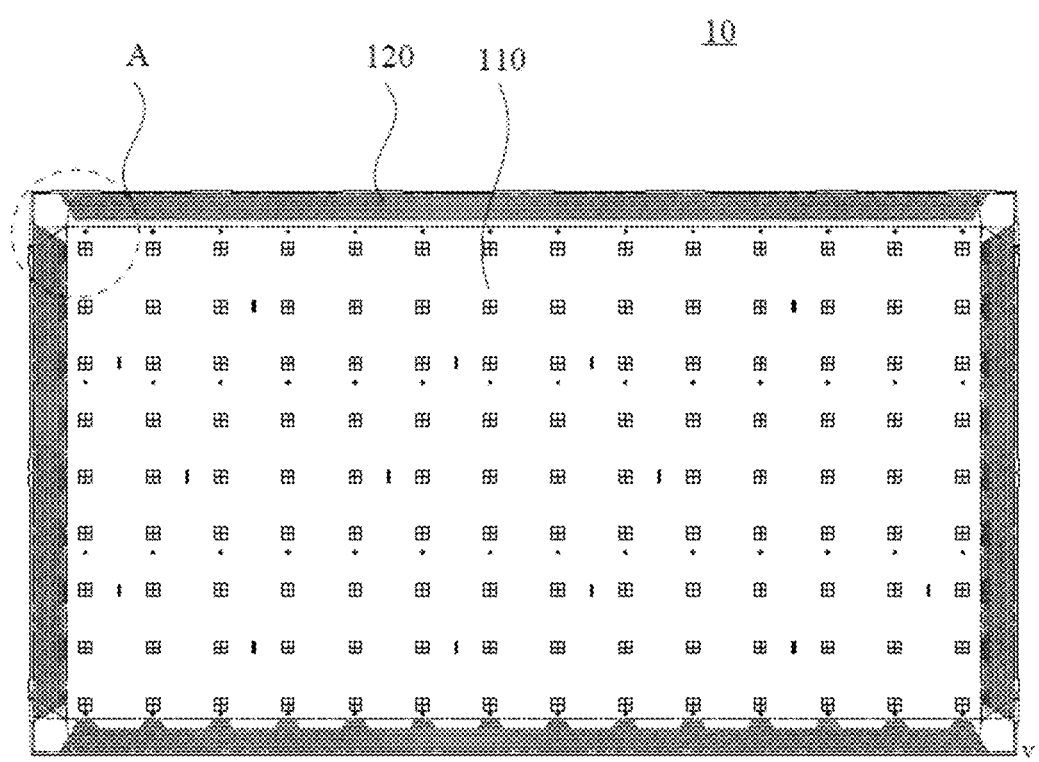
FIG. 1 is a schematic diagram of the structure of the reflector plate according to an embodiment of this application.
Figure 2:
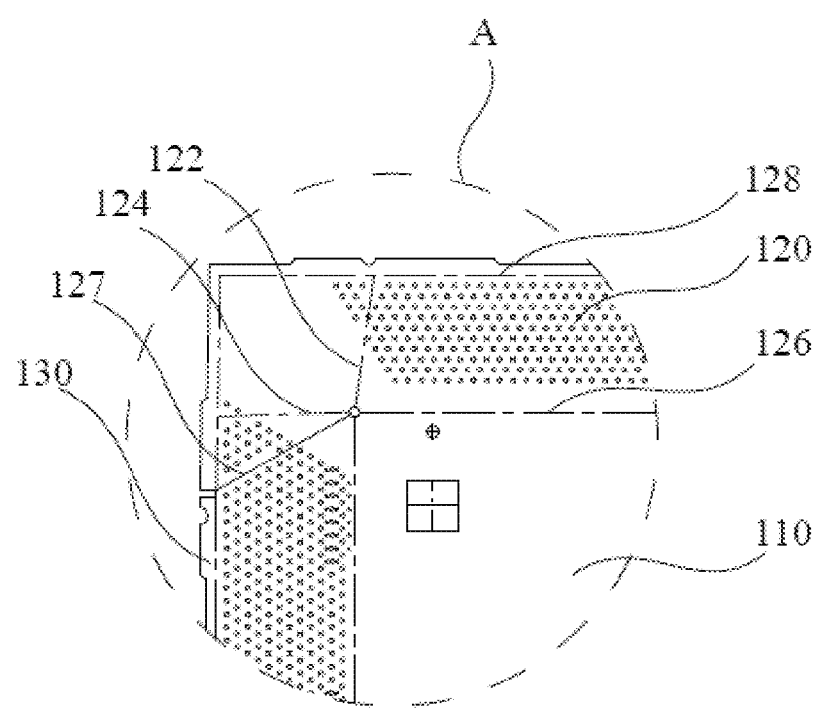
FIG. 2 is an enlarged schematic diagram of the portion A in FIG. 1.
Figure 3:
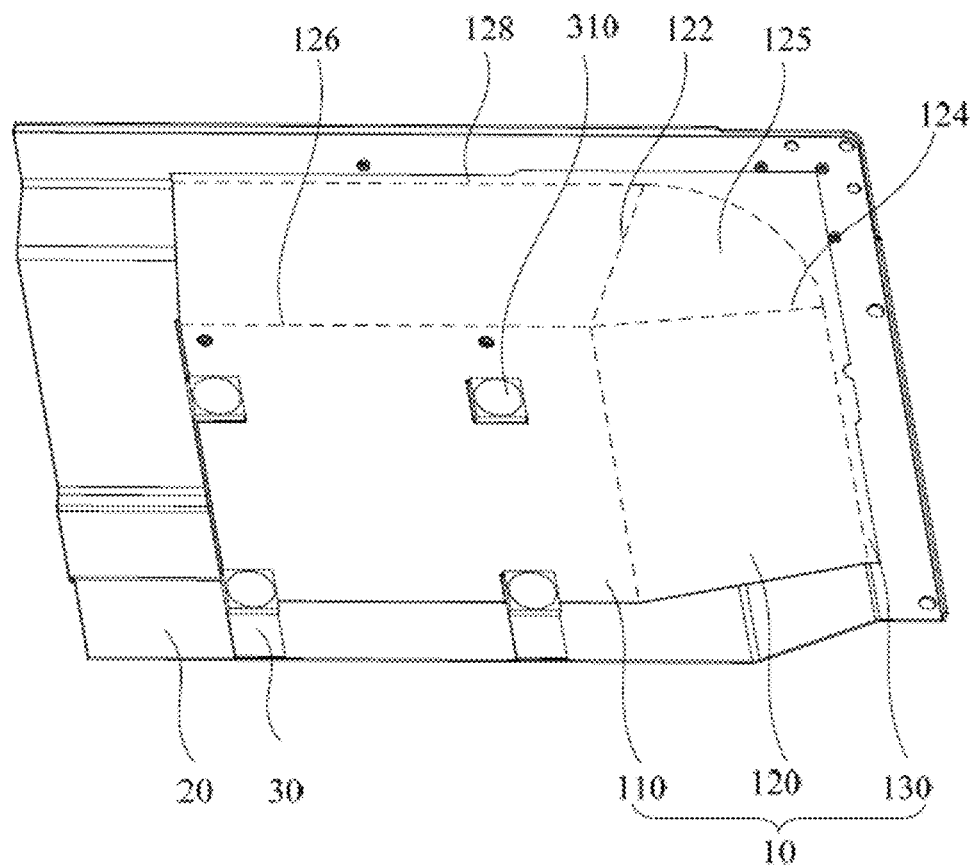
FIG. 3 is a schematic diagram of a partial structure of the backlight module according to an embodiment of this application.

Referring to FIGS. 1, 2, and 3, an embodiment of this application provides a reflector plate 10 including a reflecting main board 110 and a reflecting side board 120 arranged at the periphery of the reflecting main board 110. The reflecting side board 120 is connected to the side edge of the reflecting main board 110. A first stitching line 122 and a second stitching line 124 are arranged at a turning corner of the reflecting side board 120, such that an included angle is formed between the first stitching line 122 and the second stitching line 124. In a state where the reflecting side board 120 is inclined relative to the reflecting main board 110, the reflecting side board 120 between the first stitching line 122 and the second stitching line 124 forms a curved reflecting surface 125.

Based on the needs in use, in another embodiment, a first fold line and a second fold line may also be arranged at the turning corner of the reflecting side board, such that an included angle is formed between the first fold line and the second fold line. In a state where the reflecting side board is inclined relative to the reflecting main board, the reflecting side board between the first fold line and the second fold line forms the curved reflecting surface.

During use, the reflecting side board 120 is inclined relative to the reflecting main board 110, that is, the reflecting main board 110 is stacked on the backplane 20, and the reflecting side board 120 is bended toward the inner side of the backplane 20 relative to the reflecting main board 110 to form an inclined surface. And at the same time, the reflecting side board 120 between the first stitching line 122 and the second stitching line 124 or between the first fold line and the second fold line is correspondingly inclined to form a curved reflecting surface 125, so that the portion at the corner of the reflector plate 10 is in a smooth transition, and the distance between the curved reflecting surface 125 and the backlight source 30 at the corner can also be closer, and the light emitted from the backlight source 30 can illuminate the curved reflecting surface 125, so as to increase the brightness value of this area, thereby achieving the objective of eliminating the shadow phenomenon.

Referring to FIGS. 2 and 3, in one of the embodiments, the intersection point of the first stitching line 122 and the second stitching line 124 or the intersection point of the first fold line and the second fold line is located at a vertex of the reflecting main board 110. That is, a vertex of the curved reflecting surface 125 coincides with a vertex of the reflective main plate 110, which facilitates the machine-shaping of the reflector plate 10, and simultaneously facilitates the formation of the curved reflecting surface 125.

Optionally, the included angle between the first stitching line 122 and the second stitching line 124 or the included angle between the first fold line and the second fold line is in a range of 45° to 120°. On one hand, it ensures that the forming area of the curved reflecting surface 125 improves the brightness of the corner. On the other hand, it facilitates the assembly of the reflector plate 10. In one of the embodiments, the included angle between the first stitching line 122 and the second stitching line 124 or the included angle between the first fold line and the second fold line is 90°.

Referring to FIGS. 2 and 3, in one of the embodiments, the reflecting side board 120 and the side edge of the reflecting main board 110 are connected by a third stitching line 126 or a third fold line. This facilitates the assembly of the reflector plate 10. During assembly, the reflecting side board 120 is inclined relative to the reflecting main board 110 through the third stitching line 126 or the third fold line.

Referring to FIGS. 2 and 3, in one of the embodiments, a mounting plate 130 is arranged at the periphery of the reflecting side board 120, and the mounting plate 130 and the side edge of the reflecting side board 120 are connected by a fourth stitching line 128 or a fourth fold line. By providing the mounting plate 130, the reflector plate 10 can be overlapped on the folded edge of the backplane 20, which facilitates the installation and location of the reflector plate 10.

As shown in FIG. 2, in one of the embodiments, a breaking line 127 is arranged on the reflecting side board 120, and in the state where the reflecting side board 120 is inclined relative to the reflecting main board 110, the reflecting side board 120 on both sides of the breaking line 127 are butt-joined together. By providing the breaking line 127, the reflecting side board 120 is broken, and at the end of the breaking line 127, the reflecting side board 120 is provided with a breaking opening. In the assembled state, that is, when the reflecting side board 120 is placed at an angle, one side of the breaking opening abuts against the other side of the breaking opening, wherein the length between the two sides of the breaking opening is designed according to the actual size of the turning corner. Thereinto, the design of the breaking line 127 is to facilitate stress relief during the assembly process and facilitate installation. The design of the breaking opening enables the reflecting side board 120 on both sides of the breaking line 127 to be butt-joined together after assembly, thereby avoiding generating gaps, which affects the brightness uniformity of the joint.

Referring to FIG. 1, in one of the embodiments, the reflecting side board 120 has a polygonal ring shape. In this embodiment, the reflector plate 10 is rectangular, and the reflective main plate 110 is rectangular. Each turning corner of the reflecting side board 120 is provided with the first stitching line 122 and the second stitching line 124 or with the first fold line and the second fold line. By providing a curved reflecting surface 125 at each turning corner of the reflector plate 10, the brightness at each corner is increased, thereby avoiding the appearance of the shadow.

Referring to FIG. 3, another embodiment of this application provides a backlight module, including a backplane 20, a backlight source 30 and the reflector plate 10. The backlight source 30 and the reflector plate 10 are arranged on the backplane 20, and a light transmission hole is opened on the reflector plate 10, and an illuminating element 310 of the backlight source 30 is arranged corresponding to the light transmission hole.

According to the backlight module of the embodiment, the reflecting side board 120 is inclined relative to the reflecting main board 110, that is, the reflecting main board 110 is stacked on the backplane 20, and the reflecting side board 120 is bended toward the inner side of the backplane 20 relative to the reflecting main board 110 to form an inclined surface. And at the same time, the reflecting side board 120 between the first stitching line 122 and the second stitching line 124 or between the first fold line and the second fold line is correspondingly inclined to form a curved reflecting surface 125. Thus, the portion at the corner of the reflector plate 10 is in a smooth transition, and the distance between the curved reflecting surface 125 and the backlight source 30 at the corner can also be closer, and the light emitted from the illuminating element 310 of the backlight source 30 through the light transmission hole can illuminate the curved reflecting surface 125, so as to increase the brightness value of this area, thereby achieving the objective of eliminating the shadow phenomenon. In another embodiment, the backlight module further includes a diffuser sheet or other optical film stacked on one side of the reflector plate 10 for adjusting the light.

Referring to FIGS. 1-3, an embodiment provides a display terminal, including the reflector plate 10 or the backlight module. The display terminal including the reflector plate 10 of any one of the above-mentioned embodiments or the backlight module of the above-described embodiment, the brightness values at the corners are increased, has the beneficial effects that the shadow phenomenon is less, and the overall brightness is more uniform.

The respective technical features of the above-mentioned embodiments can be combined in any order. In order to make the description concise, not all possible combinations of the respective technical features in the above-mentioned embodiments are described. However, as long as there is no contradiction in the combination of these technical features, all should be considered as the scope of this description.

The above-mentioned embodiments only express several implementing modes of the application, and the description is relatively concrete and detailed, but it should not be understood as a limitation on the scope of the disclosure. It should be pointed out that for those skilled in the art, without departing from the concept of the application, several modifications and improvements can be made, which all fall within the claimed scope of this application. Therefore, the claimed scope of the application should be subject to the appended claims.

What is claimed is:

1. A reflector plate, comprising a reflecting main board and a reflecting side board, wherein
the reflecting side board is arranged at a periphery of the reflecting main board, and the reflecting side board is connected to a side edge of the reflecting main board; and
a first stitching line and a second stitching line are arranged at a turning corner of the reflecting side board, and an included angle is formed between the first stitching line and the second stitching line; and in a state where the reflecting side board is inclined relative to the reflecting main board, the reflecting side board between the first stitching line and the second stitching line forms a curved reflecting surface.

2. The reflector plate according to claim 1, wherein when the first stitching line and the second stitching line are arranged at the turning corner of the reflecting side board, an intersection point of the first stitching line and the second stitching line is located at a vertex of the reflecting main board.

3. The reflector plate according to claim 1, wherein when the first stitching line and the second stitching line are arranged at the turning corner of the reflecting side board, the included angle between the first stitching line and the second stitching line is in a range of 45° to 120°.

4. The reflector plate according to claim 3, wherein when the first stitching line and the second stitching line are arranged at the turning corner of the reflecting side board, the included angle between the first stitching line and the second stitching line is 90°.

5. The reflector plate according to claim 1, wherein a third stitching line is arranged at a junction of the reflecting side board and the side edge of the reflecting main board, and the reflecting side board and the side edge of the reflecting main board are connected by the third stitching line.

6. The reflector plate according to claim 1, wherein a breaking line is arranged on the reflecting side board, and in the state where the reflecting side board is inclined relative to the reflecting main board, the reflecting side board on both sides of the breaking line are butted and joined together.

7. The reflector plate according to claim 1, wherein a mounting plate is arranged at the periphery of the reflecting side board, and the mounting plate is connected to the side edge of the reflecting side board.

8. The reflector plate according to claim 1, wherein the reflecting side board has a polygonal ring shape, and each turning corner of the reflecting side board is provided with the first stitching line and the second stitching line.

9. A display terminal comprising a backlight module comprising a backplane, a backlight source and a reflector plate according to claim 1, in which the backlight source and the reflector plate are arranged on the backplane, and a light transmission hole is opened on the reflector plate, and the backlight source comprises an illuminating element, and the illuminating element is arranged corresponding to the light transmission hole.

10. The reflector plate according to claim 6, wherein at the end of the breaking line, the reflecting side board is provided with a breaking opening, and in the state where the reflecting side board is inclined relative to the reflecting main board, one side of the breaking opening abuts against the other side of the breaking opening.

11. The reflector plate according to claim 7, wherein a fourth stitching line is arranged at a junction of the mounting plate and the side edge of the reflecting side board, and the mounting plate and the side edge of the reflecting side board are connected by the fourth stitching line.

12. A reflector plate, comprising a reflecting main board and a reflecting side board, characterized in that
the reflecting side board is arranged at a periphery of the reflecting main board, and the reflecting side board is connected to a side edge of the reflecting main board; and
a first fold line and a second fold line are arranged at the turning corner of the reflecting side board, and an included angle is formed between the first fold line and the second fold line; and in a state where the reflecting side board is inclined relative to the reflecting main board, the reflecting side board between the first fold line and the second fold line forms the curved reflecting surface.

13. The reflector plate, according to claim 12, wherein when the first fold line and the second fold line are arranged at the turning corner of the reflecting side board, an intersection point of the first fold line and the second fold line is located at a vertex of the reflecting main board.

14. The reflector plate, according to claim 12, wherein when the first fold line and the second fold line are arranged at the turning corner of the reflecting side board, the included angle between the first fold line and the second fold line is in a range of 45° to 120°.

15. The reflector plate according to claim 14, wherein when the first fold line and the second fold line are arranged at the turning corner of the reflecting side board, the included angle between the first fold line and the second fold line is 90°.

16. The reflector plate according to claim 12, wherein a breaking line is arranged on the reflecting side board, and in the state where the reflecting side board is inclined relative to the reflecting main board, the reflecting side board on both sides of the breaking line are butted and joined together.

17. The reflector plate according to claim 16, wherein at the end of the breaking line, the reflecting side board is provided with a breaking opening, and in the state where the reflecting side board is inclined relative to the reflecting main board, one side of the breaking opening abuts against the other side of the breaking opening.

18. The reflector plate according to claim 12, wherein a mounting plate is arranged at the periphery of the reflecting side board, and the mounting plate is connected to the side edge of the reflecting side board.

19. The reflector plate according to claim 18, wherein a fourth fold line is arranged at a junction of the mounting plate and the side edge of the reflecting side board, and the mounting plate and the side edge of the reflecting side board are connected by the fourth fold line.

20. The reflector plate according to claim 12, wherein each turning corner of the reflecting side board is provided with the first fold line and the second fold line.

* * * * *